United States Patent
Zoricic et al.

(10) Patent No.: US 12,486,042 B2
(45) Date of Patent: Dec. 2, 2025

(54) HOLDING PATTERN DETECTION AND MANAGEMENT

(71) Applicant: THE BOEING COMPANY, Arlington, VA (US)

(72) Inventors: Marko Zoricic, Dreieich (DE); Andreas Sindlinger, Weinheim (DE); David Scarlatti, Madrid (ES)

(73) Assignee: The Boeing Company, Arlington, VA (US)

( * ) Notice: Subject to any disclaimer, the term of this patent is extended or adjusted under 35 U.S.C. 154(b) by 292 days.

(21) Appl. No.: 18/161,881

(22) Filed: Jan. 30, 2023

(65) Prior Publication Data

US 2024/0253810 A1 Aug. 1, 2024

(51) Int. Cl.
*B64D 45/00* (2006.01)
*G08G 5/54* (2025.01)

(52) U.S. Cl.
CPC .............. *B64D 45/00* (2013.01); *G08G 5/54* (2025.01)

(58) Field of Classification Search
CPC ...... B64D 45/00; G08G 5/025; G08G 5/0026; G08G 5/0039; G08G 5/0082; G08G 5/0013; G08G 5/0043; G08G 5/0052
See application file for complete search history.

(56) References Cited

U.S. PATENT DOCUMENTS

| | | | | |
|---|---|---|---|---|
| 4,182,171 A * | 1/1980 | Looker | ...................... | G01S 5/08 |
| | | | | 73/178 R |
| 4,274,204 A * | 6/1981 | Self | ........................ | G01C 21/20 |
| | | | | 235/61 B |
| 6,847,866 B2 * | 1/2005 | Gaier | ...................... | G01C 23/00 |
| | | | | 701/4 |
| 2009/0319100 A1 * | 12/2009 | Kale | ........................ | G08G 5/34 |
| | | | | 701/4 |
| 2013/0179059 A1 * | 7/2013 | Otto | .......................... | G08G 5/34 |
| | | | | 701/120 |
| 2014/0257684 A1 * | 9/2014 | Wilder | ...................... | G08G 5/55 |
| | | | | 701/120 |
| 2018/0286257 A1 | 10/2018 | Schwartz et al. | | |
| 2018/0322793 A1 * | 11/2018 | Huang | ...................... | G08G 5/76 |
| 2020/0105148 A1 * | 4/2020 | DeWeese | ................. | G08G 5/54 |
| 2020/0294405 A1 * | 9/2020 | Foltan | ....................... | G08G 5/34 |
| 2021/0027636 A1 * | 1/2021 | Dziecielski | .............. | G08G 5/26 |
| 2021/0027640 A1 * | 1/2021 | Meringer | ............... | G06Q 10/04 |
| 2022/0076583 A1 | 3/2022 | Gu et al. | | |

OTHER PUBLICATIONS

European Patent Office, Extended European Search Report for European Patent Application No. 24154410.5, dated Jul. 1, 2024.
Gonzalez et al.: "Voice communication benefits from RNAV/RNP in en route and terminal environments", Integrated Communications, Navigation and Surveillance Conference (ICNS), 2013, IEEE, Apr. 22, 2013 (Apr. 22, 2013), pp. 1-14, XP032432041, DOI: 10.1109/ICNSURV.2013.6548545 ISBN: 978-1-4673-6251-1.

* cited by examiner

*Primary Examiner* — Russell Frejd
(74) *Attorney, Agent, or Firm* — Harrity & Harrity, LLP

(57) ABSTRACT

The present disclosure provides for holding pattern detection and management by detecting an aircraft has traveled at least a predefined distance along a flight path for the aircraft, identifying from flight data for an aircraft that the aircraft has performed maneuvers that may indicate a holding pattern, determining that the aircraft is not in a racetrack pattern, and when the aircraft is not in a racetrack pattern, indicating that the aircraft is in a holding pattern.

20 Claims, 7 Drawing Sheets

HOLDING PATTERN DETECTION AND MANAGEMENT

FIELD

Aspects of the present disclosure relate to flight management. More particularly, the present disclosure relates to Artificial Intelligence systems using real-time data to predict and manage flights in holding patterns using distances associated with flight paths and distances to aircraft destinations, and to provide accurate arrival times of those flights.

BACKGROUND

A flight diversion refers to a change in a flight plan that affects the destination and flight time of an aircraft flight (i.e., where and when the aircraft actually lands). For example, an aircraft originally destined for a first airport may divert its flight plan to different airport when the first airport is experiencing delay conditions (e.g., inclement weather, runway congestion, etc.), or when the aircraft experiences a flight plan alteration (e.g., the aircraft is low on fuel, technical difficulties occur, a person on board the aircraft is experiencing a medical issue, etc.). Whether an event affects multiple aircraft (e.g., a diverting event at an airport or along a flight corridor) or a single aircraft, the diverted aircraft, its passengers, cargo, and crew need to be received and processed by the new destination, which may affect the other aircraft destined for that airport (either originally or due to a diversion), which can cascade into further delays or secondary diversions. In order to prevent large scale disruptions in an air traffic network, aircraft dispatchers often instruct aircraft destined to an airport experiencing various disruptions or delay conditions, to enter a holding pattern (e.g., to circle an original destination airport) until the delay disruptions end. Placing aircraft into a holding pattern often prevents a need to divert the aircraft to a different destination. However, aircraft holding patterns also result in additional complexities in the greater air traffic network and results in negative passenger experiences, increased wear on aircraft, increased crew fatigue, and other issues.

In some examples, a holding pattern is a series of flight maneuvers which keep an inflight aircraft aloft and available to receive further commands, but not progressing towards a destination. For example, an aircraft may be instructed to hold and will fly around a set airspace (e.g., near airport a destination airport) until a runway is available. Various holding patterns at various altitudes can accommodate several in-flight aircraft around a given location. For example, several aircraft may circle an airport or designated holding pattern airspace at different altitudes or at different positions around a path at the same altitude. Identifying and managing aircraft that may be entering a holding pattern or maintaining a holding pattern remains a challenge for aircraft operators.

SUMMARY

The present disclosure provides a method for holding pattern detection and management that includes: detecting, from flight data for an, aircraft that the aircraft has traveled at least a predefined distance along a flight path for the aircraft. The method also includes identifying from the flight data for the aircraft that the aircraft has performed a first turn. The method also includes identifying from the flight data that the aircraft has performed a leg traverse after performing the first turn and identifying from the flight data that the aircraft has performed a second turn in a direction circuitous to the first turn after performing the leg traverse. The method also includes determining from the flight data for the aircraft a vicinity distance from a destination airport and when the vicinity distance is above a vicinity threshold, indicating that the aircraft is in a holding pattern.

In some aspects, according to any method described above or below, the method may include: when the vicinity distance is below a vicinity threshold, determining from the flight data for the aircraft, a difference between an altitude of the aircraft during the first turn and an altitude of the aircraft during the second turn, when the difference is above an altitude change threshold, indicating that the aircraft is in a racetrack pattern, and when the difference is below the altitude change threshold, indicating that the aircraft is in the holding pattern.

In some aspects, according to any method described above or below, the method may include: when the vicinity distance is below a vicinity threshold, comparing aircraft maneuvers and altitudes of the aircraft during the first turn, during the second turn, and during the leg traverse to maneuvers and altitudes in a predefined racetrack procedure, when the comparison indicates a match between the maneuvers and altitudes of the aircraft and maneuvers and altitudes in the predefined racetrack procedure, indicating that the aircraft is in a racetrack pattern, and when comparison indicates no match between the maneuvers and altitudes of the aircraft and maneuvers and altitudes in the predefined racetrack procedure, indicating that the aircraft is in the holding pattern.

In some aspects, according to any method described above or below, the first turn and the second turn are identified as turns based on the flight data for the aircraft indicating that the aircraft performed a course change between 70 and 270 degrees from an inbound leg.

In some aspects, according to any method described above or below, a turn may include of a sequence of samples from the flight data in which a direction of the course change is constant.

In some aspects, according to any method described above or below, the leg traverse may include of a sequence of samples from the flight data in which a cumulative turn is less than a predefined arc threshold and a length of travel is less than a predefined distance threshold.

In some aspects, according to any method described above or below, the flight data indicate that the aircraft is at least above a predefined altitude when indicating that the aircraft is in the holding pattern.

In some aspects, according to any method described above or below, the method may include: identifying an entry point of the holding pattern at which the first turn began, and continuing to indicate that the aircraft is in the holding pattern until the aircraft is a predefined distance away from the entry point or drops below a predefined altitude. Implementations of the described techniques may include hardware, a method or process, or computer software on a computer-accessible medium.

The present disclosure also provides a method for holding pattern detection and management that includes: detecting, from flight data for an aircraft, that the aircraft has traveled at least a predefined distance along a flight path for the aircraft and identifying from flight data for an aircraft that the aircraft has passed within a predefined distance of a fixpoint. The method also includes identifying from the flight data that the aircraft has performed a turn in a known direction associated with a historical holding pattern charted from the fixpoint and determining from the flight data for the aircraft a vicinity distance from a destination airport. The method also includes when the vicinity distance is above a vicinity threshold, indicating that the aircraft is in a holding pattern.

In some aspects, according to any method described above or below, the method may include: when the vicinity distance is below a vicinity threshold, determining from the flight data for the aircraft, a difference between an altitude of the aircraft at a first time before performing the turn in the known direction and an altitude of the aircraft at a second time after performing the turn in the known direction, when the difference is above an altitude change threshold, indicating that the aircraft is in a racetrack pattern, and when the difference is below the altitude change threshold, indicating that the aircraft is in the holding pattern.

In some aspects, according to any method described above or below, the method may include: when the vicinity distance is below a vicinity threshold, comparing aircraft maneuvers and altitudes of the aircraft during the performance of the turn in the known direction to maneuvers and altitudes in a predefined racetrack procedure, when the comparison indicates a match between the maneuvers and altitudes of the aircraft and maneuvers and altitudes in the predefined racetrack procedure, indicating that the aircraft is in a racetrack pattern, and when comparison indicates no match between the maneuvers and altitudes of the aircraft and maneuvers and altitudes in the predefined racetrack procedure, indicating that the aircraft is in the holding pattern.

In some aspects, according to any method described above or below, the method may include: identifying from flight data for the aircraft that the aircraft has passed within a second predefined distance of a second fixpoint, and in response to identifying from the flight data that the aircraft has performed a second turn that is not in a second known direction associated with a second historical holding pattern charted from the second fixpoint, indicating that the aircraft is not in a second holding pattern.

In some aspects, according to any method described above or below, the turn is identified based on the flight data for the aircraft indicating that the aircraft performed a course change between 70 and 270 degrees from an inbound leg.

In some aspects, according to any method described above or below, a turn may include of a sequence of samples from the flight data in which a direction of course change is constant. The flight data indicate that the aircraft is at least above a predefined altitude when indicating that the aircraft is in the holding pattern.

In some aspects, according to any method described above or below, the method may include: continuing to indicate that the aircraft is in the holding pattern until the aircraft is a predefined distance away from the fixpoint or drops below a predefined altitude. Implementations of the described techniques may include hardware, a method or process, or computer software on a computer-accessible medium.

The present disclosure also provides a system. The system includes a processor, and a memory storage device including instructions that when executed by the processor perform an operation. The operation may include detecting from flight data for an aircraft that the aircraft has traveled at least a predefined distance along a flight path for the aircraft, identifying from the flight data for the aircraft that the aircraft has performed a first turn, identifying from the flight data that the aircraft has performed a leg traverse after performing the first turn, and identifying from the flight data that the aircraft has performed a second turn in a direction circuitous to the first turn after performing the leg traverse, determining from the flight data for the aircraft a vicinity distance from a destination airport, and when the vicinity distance is above a vicinity threshold, indicating that the aircraft is in a holding pattern. Other embodiments of this aspect include corresponding computer systems, apparatus, and computer programs recorded on one or more computer storage devices, each configured to perform the actions of the methods.

In some aspects, according to any system described above or below the operation further may include: when the vicinity distance is below a vicinity threshold, determining from the flight data for the aircraft, a difference between an altitude of the aircraft during the first turn and an altitude of the aircraft during the second turn, when the difference is above an altitude change threshold, indicating that the aircraft is in a racetrack pattern, and when the difference is below the altitude change threshold, indicating that the aircraft is in the holding pattern.

In some aspects, according to any system described above or below the operation further may include: when the vicinity distance is below a vicinity threshold, comparing aircraft maneuvers and altitudes of the aircraft during the first turn, during the second turn, and during the leg traverse to maneuvers and altitudes in a predefined racetrack procedure, when the comparison indicates a match between the maneuvers and altitudes of the aircraft and maneuvers and altitudes in the predefined racetrack procedure, indicating that the aircraft is in a racetrack pattern, and when comparison indicates no match between the maneuvers and altitudes of the aircraft and maneuvers and altitudes in the predefined racetrack procedure, indicating that the aircraft is in the holding pattern.

In some aspects, according to any system described above or below the first turn and the second turn are identified as turns based on the flight data for the aircraft indicating that the aircraft performed a course change between 70 and 270 degrees from an inbound leg.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure further relates to systems and methods for detecting when an aircraft is deviating from a direct flight path, such as when the aircraft is in a holding pattern. By quickly determining when an aircraft is in a holding pattern, improvements to the ability to predict the effects of the held aircraft on other aircraft can be realized by an aircraft operator or air traffic controller. For example, when a number of aircraft are in detected holding patterns around a given airport, an operator detecting that those aircraft are in holding patterns rather than on approach to land (or in takeoff) sooner allows the operator to decide whether other aircraft destined for the given airport should alter their flight plans (e.g., divert from the flight plan), and thus to save fuel and reduce congestion at that airport (instead of having additional aircraft enter into holding patterns for the airport) among other benefits.

Figure 1:
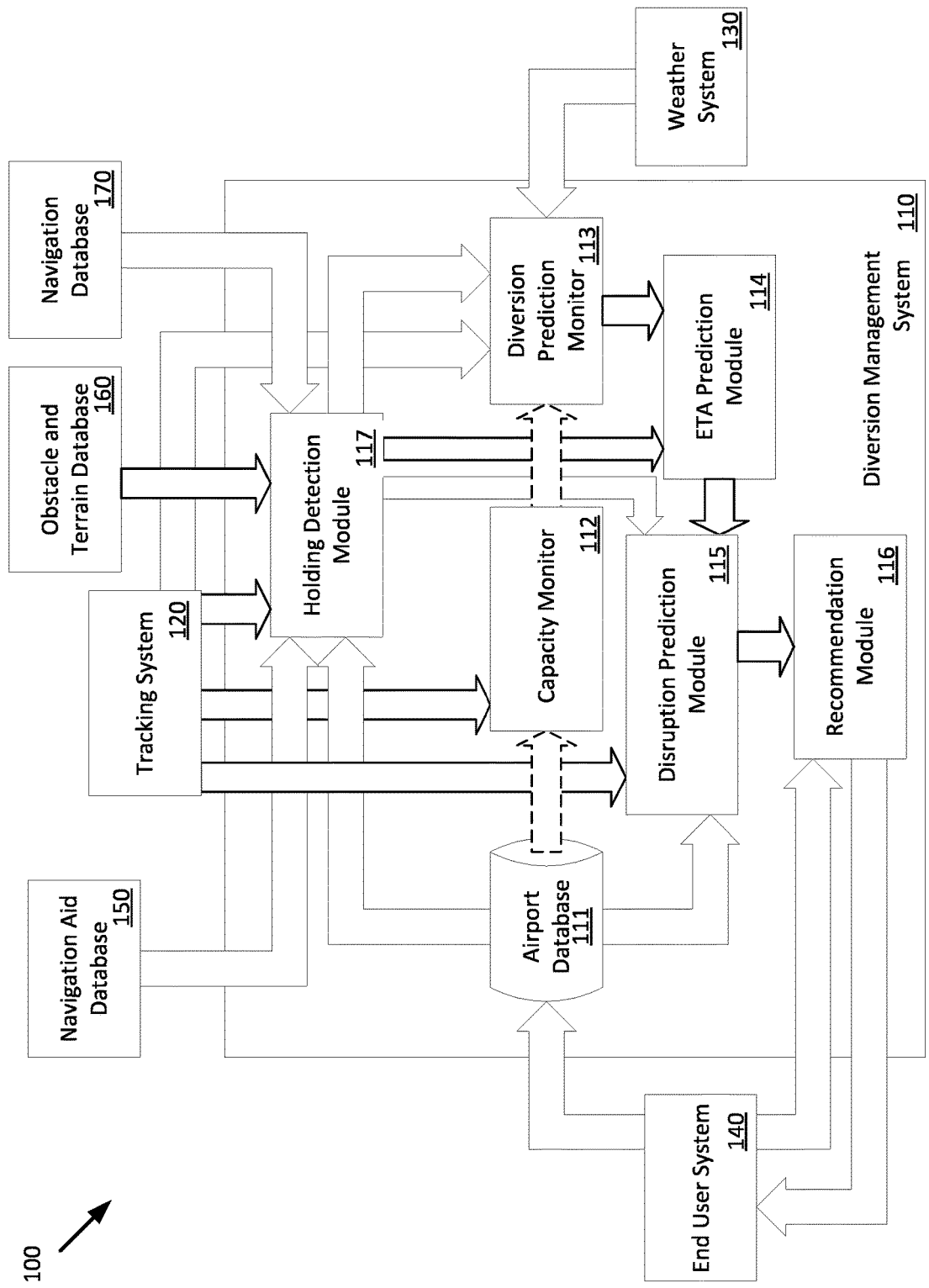
FIG. 1 illustrates a holding detection and diversion prediction environment, according to aspects of the present disclosure.

FIG. 1 illustrates a diversion prediction environment 100, according to aspects of the present disclosure. A diversion management system 110 is provided on a computing device, (such as a computing device 700, which is discussed in greater detail herein in regard to FIG. 7) to proactively manage flights predicted to be at risk for diversion. The diversion management system 110 is in communication with a tracking system 120, a weather system 130, an end-user system 140, and a navigation aid database 150, an obstacle and terrain database 160, and a navigation database 170, which may be included on the same computing device as the diversion management system 110 and/or one another, or on separate computing devices. Additionally, although illustrated as individual systems, each of the diversion management system 110, tracking system 120, weather system 130, end-user system 140, navigation aid database 150, obstacle and terrain database 160, and navigation database 170 may represent one or a plurality of individual systems of the indicated type which may be provided by an individual computing device or by a distributed computing environment. When provided by separate devices, the various systems are communicatively connected to one another by one or more of a wireless or wired network, broadcast services, and beamed services (e.g., directed satellite communication and microwave point-to-point communications).

In some examples, the tracking system 120 provides flight tracking data from various aircraft in a zone of aircraft control for the diversion management system 110. In various aspects, the tracking data may include ADS-B (Automatic Dependent Surveillance-Broadcast) data, radar positioning data, transponder data, and other data that indicate where an aircraft is located (including altitude), the heading of the aircraft, and the speed at which the aircraft is traveling. For ADS-B data, the individual aircraft receive satellite positioning information to determine where that aircraft is currently located and the current velocity of that aircraft, which the individual aircraft broadcast for reception by one or more tracking systems 120.

In various aspects, the tracking system 120 receives the flight tracking data from all of the transmitting aircraft in the zone of aircraft control by various receivers at various geographic locations, which are then collated into a single dataset to observe the flight paths of all of the aircraft in the one of aircraft control. In various aspects, the zone of aircraft control is global (i.e., includes the tracking data for all actively transmitting or tracked aircraft), but may also be localized (e.g., all active/transmitting aircraft within a determined range of an airport or other navigational feature, within a country's airspace, within a region, etc.). In some aspects, the tracking data further identifies the particular aircraft (e.g., flight X operated by airline A), the type of aircraft and the operator of the aircraft, which the diversion management system 110 correlates to known aircraft characteristics (e.g., carries X passengers, requires a runway at least Y m long, uses facilities in general aviation or associated with airline A or C (but not B)), the origin and destination (and any known waypoints) for the current (or original) flight plan for the aircraft, etc. These flight tracking data may further provide deviation data from the original flight plan; indicating to what extent the aircraft is off course (including flying at a different altitude than originally planned), ahead or behind of schedule, flying faster or slower than originally planned, or being directed to a different destination than originally planned.

The weather system 130 receives current weather data and weather forecast data (collectively, weather data) correlated to various locations in the zone of flight control. In various aspects, the weather data include METAR (Meteorological Aerodrome Reports) data, Terminal Aerodrome Forecasts (TAF) data, and other current, short-term, or long-term sets of information related to localized weather. The weather data may indicate one or more of: temperature; humidity; wind speed; chance of, amount of, and type of precipitation (e.g., rain, snow, hail); chance of lightning; and ground based conditions that may affect air patterns (e.g., volcanic eruptions, forest fires, floods), among other examples.

In some examples, the end-user system 140 represents the computing systems of one or more flight dispatchers or aircrews (e.g., pilots, copilots, navigators, etc.). Flight dispatchers include Air Traffic Controllers (ATC), airport operators, and ground-based airline operators who have control over whether and where an aircraft is diverted.

The end-user systems 140 may indicate to the diversion management system 110 various requirements or reasons behind a diversion, and the various amenities and facilities at or near each airport. For example, a Fixed Base Operator (FBO) at a given airport may periodically update an airport database 111 with the conditions and services available at an associated airport. In another example, a flight controller for an airline may indicate that a given aircraft needs to be diverted due to a medical issue or technical issue on the aircraft so that the diversion management system 110 will recommend airports to divert to with appropriate resources to resolve the issue (e.g., medical or maintenance teams and facilities at or nearby the selected airport). The diversion management system 110, in turn, uses the received flight tracking data, weather data, knowledge of the airports in the airport database 111, and needs indicated by the end-user system 140 (if indicated), to determine one or more "best" airports to divert a given aircraft to, which are provided in a recommendation or alert to the end-user system 140 to select as the new destination for a flight.

The navigation aid database 150 provides historical data about navigational paths taken by aircraft, such as, for example, fixpoints where aircraft have been instructed to enter into holding patterns in the past or have been observed to be in holding patterns in the past.

The obstacle and terrain database 160 provides encoded terrain and obstacles data for additional holding determination filtering. The Navigation database 170 provides encoded (e.g. ARINC or AIXM format) valid holdings and racetrack procedures published by Air Navigation Services Providers (ANSP). For example, racetrack routes or procedures include maneuvers that may have a same shape as holding pattern, but these maneuvers are officially part of a flight plan and are used to provide aircraft alignment to a landing path or in order to reduce altitude for landing procedure.

In some examples, in order to determine which airports are the "best" for a given potential diversion, the diversion management system 110 uses the received data to develop a holistic view of the current flight situation in a zone of aircraft control, such as by identifying where all of the aircraft are located and headed, identifying what resources remain available at each airport, and predicting how the aircraft and airports interact over time in view of the operations of those aircraft and airports.

The diversion management system 110 also includes an airport database 111 that identifies what resources (e.g., number and lengths of runways, numbers and types of gates/terminals, maintenance facilities, fuel capacity, hangar space, customs stations) are available at each airport, and what services are located nearby each airport (e.g., ground transportation options, lodging options, medical services), and where each airport is located. In some examples, end users may update, or a provider of the diversion management system 110 may curate, the airport database 111 to reflect the most recent conditions for one or more airports (e.g., when a new runway is opened, when a terminal is closed for remodeling).

In some aspects, a capacity monitor 112 receives the information about each airport from the airport database 111 and the flight tracking information from the tracking system 120 to determine a capacity rate for various metrics for the airports, such as, for example, the percentage of runways in use, the percentage of gates occupied by aircraft, the usage rate of the maintenance crews at the airport, etc., based on what aircraft arrived at what times from the flight tracking data received over time. The capacity monitor 112 provides an up-to-date data set of the airport operating conditions at each airport in the zone of flight control that indicate what services and resources are nominally available and what services are resources are expected to be in use or otherwise unavailable to incoming aircraft.

A diversion prediction module 113 receives the weather data, flight tracking data, holding determination data, and (optionally) the capacity rates of the airports to determine when an aircraft is likely to be diverted and what airports that aircraft is likely to be diverted to. For example, when active, the diversion prediction module 113 may receive, for example, live airport data, live weather data, live flight tracking data, and live hold status data to produce flight prediction data that indicate a prediction of whether a given flight will be diverted and what airports that flight will be diverted to (if diverted). In various aspects, the diversion prediction module 113 uses the most up-to-date data available for the live data, such as when a data feed is interrupted. The flight prediction data indicate a diversion likelihood that exceeds a predefined likelihood threshold, and that a given aircraft should be directed to land at a different airport than the flight plan originally indicated. In some examples, the diversion prediction module 113 standardizes and establishes a mutual relation between the received data to produce a dataset of a standardized format and time/location signature so that data received for different or offset locations and/or times can be compared to one another. Accordingly, data related to a first geographical region and a second geographical region that are noncontiguous or partially contiguous and/or data received at different rates and/or different times can be combined together to provide a coherent and standardized data set for later analysis.

The diversion prediction module 113 also identifies portions of the dataset that are used by the AI models to identify and predict whether a flight will be diverted and, if so, to what diversion destination. In some examples, the diversion prediction module 113 extracts one or more of: a trajectory shape for the flight plan for an aircraft, a distance and angle to the current destination for an aircraft, weather, a number of flights currently holding at an airport, the origin of an aircraft, an altitude of an aircraft, a location of an aircraft, and a heading of an aircraft. The diversion prediction module 113, for a new destination, also extracts one or more of: a trajectory shape for an aircraft, a distance and angle to the original destination, weather, a number of flights currently holding at an airport, the origin of an aircraft, an altitude of an aircraft, a location of an aircraft, and a heading of an aircraft.

In some examples, data cleaning/preprocessing and feature extraction are used on live data as well as on training data of historical airport data, historical flight tracking data, and historical weather data. In some examples, the historical flight tracking data is a supervised learning set; indicating whether a given aircraft in the historical data was diverted and to which airport. The diversion prediction module 113 trains the AI models based on the supervised learning set, for example, by a random forest method that develops and compares several models and selects a most accurate model for use for diversion detection and new destination selection.

When trained and active, the diversion prediction module 113 receives the extracted features to predict whether an aircraft will be diverted before reaching the original destination. The prediction may be output as a classification, such as "divert" or "do not divert", or output as a likelihood determination (e.g., x % likely to divert). During training, the diversion prediction module 113 may develop a likelihood threshold for when to generate a diversion trigger (e.g., trigger when the likelihood of diversion exceeds y %), or may use a user-defined likelihood threshold.

When trained and active, the diversion prediction module 113 produces flight prediction data, which indicates one or more new destinations for all of the aircraft predicted to be diverted before reaching the original destinations.

An Estimated Time of Arrival (ETA) prediction module 114 determines what the ETAs are for aircraft that are determined to be likely to be diverted to each of the candidate airports identified by the diversion prediction module 113, and may also estimate how long an aircraft currently detected to be in a holding pattern will take to reach an intended destination. For example, when a diversion is predicted at airport A that affects aircraft X destined for airport A, the diversion prediction module 113 identifies airports B and C as candidate new destinations for aircraft X, and the ETA prediction module 114 can then determine the ETAs for aircraft X to airports B and C.

In some examples, when active, the ETA prediction module 114 may receive, for example, live airport data, live weather data, live flight tracking data, live hold status data, and live flight prediction data (from the diversion prediction module 113) to produce ETAs for the predicted diverted aircraft to the candidate new destination(s) identified by the diversion prediction module 113. The ETA prediction module 114 standardizes and establishes a mutual relation between the received data to produce a dataset of a standardized format and time/location signature so that data received for different or offset locations and/or times can be compared to one another.

The ETA prediction module 114 identifies portions of the dataset that are used by the AI models to identify and predict how long an aircraft will take to reach the candidate new destinations. in some examples, the ETA prediction module 114 extracts one or more of: weather, time of year/week/day, location of the aircraft, distance to the candidate new destination, a speed of the aircraft, an altitude of an aircraft, a heading of an aircraft, and traffic along the route or at the candidate new destination.

In some examples, the ETA prediction module 114 uses data cleaning/preprocessing and feature extraction on live data as well as on training data of historical airport data, historical flight tracking data, historical weather data, and historical flight prediction data. The historical flight tracking data provides a supervised learning set, which indicates how long a given aircraft took to actually reach a given destination for the given historical features. The ETA prediction module 114 trains an ETA prediction model based on the supervised learning set, for example, by a random forest method that develops and compares several models and selects a most accurate model for use by the ETA prediction module 114.

When trained and active, the ETA prediction module 114 uses the extracted features to predict how long a given aircraft will take to reach a candidate new destination. The prediction may be output as a time-until-destination reached measurement, which may include a confidence score or error range in the estimated time of arrival at each of the candidate new destinations. The predicted ETAs for the aircraft to reach the candidate new destinations update the live flight prediction data, and may be added to the historical flight prediction data for future training purposes.

A disruption prediction module 115 of the diversion management system 110 receives capacity rates from the capacity monitor 112, the ETAs at the candidate airports from the ETA prediction module 114, the tracking data, holding determinations from the holding detection module 117, and the weather data to determine to what extent a diversion will disrupt operations at the airports. In some examples, the disruption prediction module 115 utilizes similar extraction and training methods as described above in relation to the diversion prediction module 113 and the ETA prediction module 114. For example, if airport B is able to handle an additional n aircraft in the next hour but n+m aircraft are being diverted to airport B, airport B will experience disruptions and/or secondary diversions may be required (e.g., aircraft X is diverted to airport B and is later diverted to airport C). In another example, if airport C is able to land n aircraft within m minutes, and n or more aircraft are currently holding around airport C, an aircraft destined for airport C with an ETA of m or fewer minutes will likely experience a disruption unless given priority over a currently holding aircraft. The disruption prediction module 115 therefore provides these predictions to the recommendation module 116.

A recommendation module 116 ingests the requirements and preferences of the aircraft operators, the known and predicted destinations of all of the aircraft currently in the zone of aircraft control, and predicted disruption risks for all of the available airports in the zone of aircraft control, and determines which airports are the "best" diversion destinations for the collective aircraft that are predicted to be affected by the diversion event. In some examples, the recommendation module 116 utilizes similar extraction and training methods as described above in relation to diversion prediction module 113 and ETA prediction module 114. For example, although aircraft X and aircraft Y may both be diverted from airport A to either airport B or airport C due to the same diversion event, the recommendation module 116 may recommend that aircraft X to be diverted to airport B and aircraft Y to be diverted to airport C. When recommending which airports individual aircraft are diverted to, the recommendation module 116 weighs the preferences of the aircraft operators and the disruption to the total air traffic network (e.g., to not overwhelm a given airport) to identify to a flight dispatcher one or more preferred airports to divert a given aircraft to in response to a diversion event. The recommendation module 116 also considers the requirements of the individual aircraft, for example, if aircraft X requires a sufficiently long runway, sufficiently large gateway parking spot or other berth, a customs checkpoint, or other resource that airport B lacks, the recommendation module 116 will not recommend that aircraft X be diverted to airport B.

In some examples, the diversion management system 110 proactively predicts a diversion event (e.g., using holding pattern detection techniques described herein) instead of waiting for the event to occur. This proactive prediction allows the diversion management system 110 to select from a greater number of airports to divert an aircraft to, and divert those aircraft sooner, which beneficially results in passengers reaching intended destinations sooner, flight crews being on-duty for less time, less stress on mechanical systems, less fuel consumption, etc.

In some examples, the diversion management system 110 can spread and thereby mitigate the effects of a diversion event (predicted or currently occurring) from the affected airport over the zone of flight control by monitoring all of the aircraft and the airports in the zone of flight control. For example, when a diversion event (e.g., a thunderstorm) causes flights originally destined for airport A to be diverted into holding patterns, the diversion management system 110 can identify airports en route (i.e., within a predefined distance of the current flight path) for the various aircraft bound for airport A, and spread the aircraft among the new destinations to thereby reduce the risk of disruption to any individual new destination and to the passengers and crew aboard the aircraft. To select the new destinations as early as possible and thereby reduce disruption for passengers, airlines, and airports, the diversion management system 110 trains several Artificial Intelligence (AI) models to predict the diversion events using the detected holding patterns as early as possible.

Figure 2:
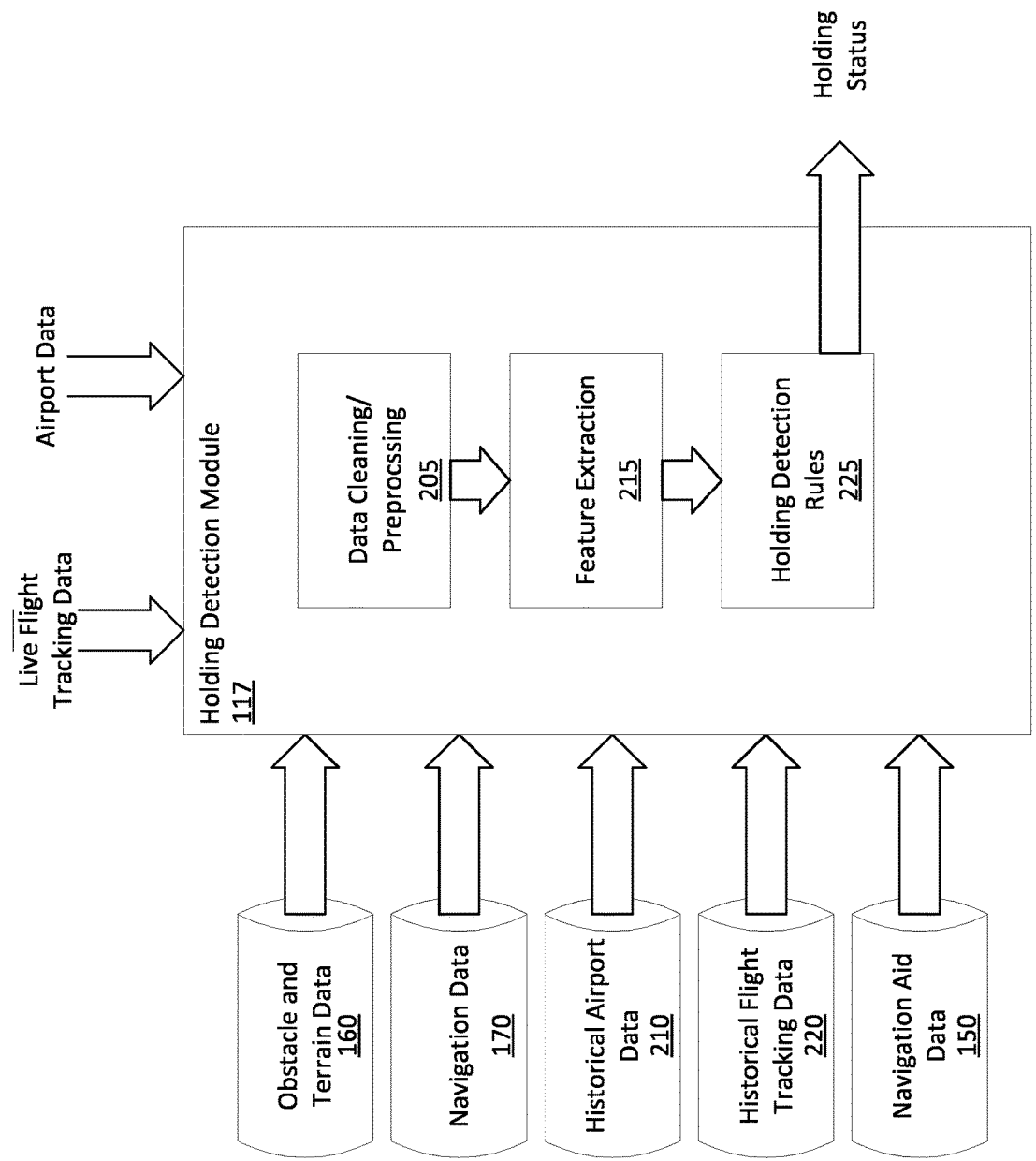
FIG. 2 illustrates a detailed view of the holding detection module, according to aspects of the present disclosure.

FIG. 2 illustrates a detailed view of the holding detection module 117, according to aspects of the present disclosure. When active, the holding detection module 117 may receive, for example, live flight tracking data and live airport data, as well as historical airport data 210, historical flight tracking data 220, navigation aid data 150, obstacle and terrain data 160, and navigation data 170 to determine whether a given aircraft is actively progressing towards a destination, or is in a holding pattern. In various aspects, the holding detection module 117 uses the most up-to-date live data available for the live data, such as when a data feed is interrupted. In some examples, a data cleaning/preprocessing module 205 standardizes and establishes a mutual relation between the received data to produce a dataset of a standardized format and time/location signature so that data received for different or offset locations and/or times can be compared to one another. Accordingly, data related to a first geographical region and a second geographical region that are noncontiguous or partially contiguous and/or data received at different rates and/or different times can be combined together to provide a coherent and standardized data set for later analysis.

A feature extraction module 215 of the holding detection module 117 identifies portions of the dataset that are used by the holding detection rules to identify whether a flight is in a holding pattern or performing another maneuver to progress towards a destination. In some examples, the feature extraction module 215 extracts one or more of: a trajectory shape for the flight path for an aircraft (including turns and straight legs that are subsets of the trajectory), a distance from the origin of an aircraft, a distance along a flight path of an aircraft, a distance from a destination of an aircraft, an altitude of an aircraft, a location of an aircraft, and a location of a fixpoint and other navigation aid at which previous holding patterns have been observed historically.

In some examples, data cleaning/preprocessing and feature extraction are used on live data as well as on the data of historical airport data 210, historical flight tracking data 220, navigation aid data 150, obstacle and terrain data 160, and navigation data 170.

The holding detection rules 225 receive the extracted features to determine whether an aircraft is currently in a holding pattern. The determination may be output as a classification, such as "holding" or "not (yet) holding", or output as a likelihood determination (e.g., x % likely to be holding). Performance of the holding detection rules 225 is discussed in greater detail in regards to FIGS. 3-6.

In some examples, the holding detection rules 225 operate as a state machine based on the input data, indicating a state or status of the flight. For example, an aircraft may be identified to be in a null state, a first leg state, a second turn state, a second leg state, a turn state, and a leg state, where a determination that the aircraft is in a holding pattern is made when the aircraft is observed to advance to the second turn state. In another example, an aircraft may be identified to be in null state, a fixpoint state, a first turn state, and outbound state, an even turn state, an inbound state, and an odd turn state, where a determination that the aircraft is in a holding pattern is made when the aircraft is observed to advance to the outbound state. The aircraft may remain identified as in a holding pattern until the aircraft drops below a predefined altitude (e.g., when landing), proceeds a predefined distance away from an entry point of the holding pattern (e.g., from where a first turn began, which may vary in different directions based on the orientation and size of the holding pattern), is determined to be in a different holding pattern, or the like.

In some aspects, the historical flight tracking data 220 and holding status provide a supervised learning set; indicating whether a given aircraft in the historical data was determined to be in a holding pattern, racetrack pattern, or other pattern, which may be used to train machine learning models to identify locations and trajectories associated with fixed points of known holding pattern trajectories or known racetrack trajectories.

Figure 3:
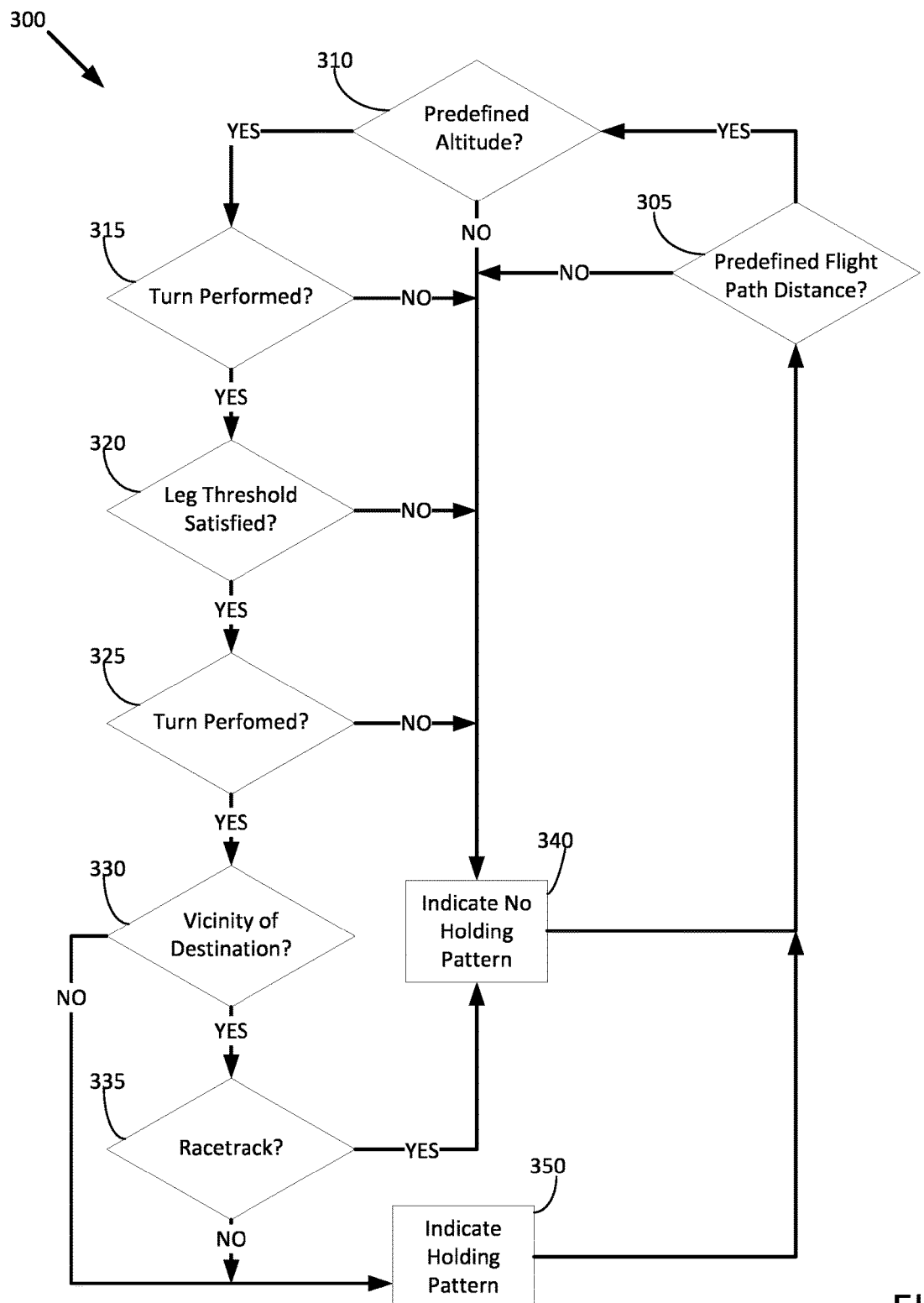
FIG. 3 is a flowchart of a method for detecting an aircraft in an uncharted holding pattern, according to aspects of the present disclosure.

FIG. 3 is a flowchart of a method 300 for detecting an aircraft in an uncharted holding pattern, according to aspects of the present disclosure. Method 300 represents one implementation of the holding detection rules applied by the holding detection module 117, which may apply several such rules in parallel at the same time to one aircraft and in parallel for several different aircraft.

Method 300 begins with block 305 where the holding detection module 117 determines whether the aircraft the aircraft has traveled at least a predefined distance along a flight path for the aircraft. In some examples, an aircraft may climbing in altitude around an origin airport due to high obstacles or terrain in the vicinity. In this example, the aircraft is constantly in a small radius away from the origin airport. In one example, the aircraft may enter into a holding pattern during this ascent, where the aircraft remains within a small radius of the origin airport. In order to avoid false-negative detection from a simple distance determination, the holding detection module 117 utilizes a predefined flown flight path distance instead (e.g. 14 nautical miles (NM)) along its flown path (in contrast to a distance from the origin airport). Additionally, using a predefined flown flight path distance filters out potential false-positive detections due to an aircraft ascending in several turns.

Accordingly, when the aircraft is less than the predefined flown flight path distance, method 300 proceeds to block 340, where the holding detection module 117 indicates that the aircraft is not in a holding pattern, or has not yet established a holding pattern.

At block 310, the holding detection module 117 determines whether the aircraft is above a predefined altitude. When the aircraft is below the predefined altitude/height (e.g., 1000 ft.), the aircraft may be engaged in a takeoff or landing maneuver, and is therefore unlikely to be in a holding pattern. Accordingly, when the aircraft is below the threshold altitude, method 300 proceeds to block 340, where the holding detection module 117 indicates that the aircraft is not in a holding pattern, or has not yet established a holding pattern.

At block 315, the holding detection module 117 identifies from the flight data for the aircraft whether the aircraft has performed a first turn. A turn defines a change in direction or course from a straight leg of travel in the flight path of the aircraft, and may be planned or unplanned (i.e., indicated in a filed flight path or not). As a turn may be part of a holding pattern or a part of a progressive path towards a destination (e.g., around busy airspace, weather patterns, etc.), the holding detection module may update the state of the aircraft when the first turn is complete, but may refrain from indicating that the aircraft is in a holding pattern until other indicia are identified, and method 300 proceeds to block 320 to determine whether those other indicia are present. However, if the aircraft has not performed a turn, method 300 proceeds to block 340, where the holding detection module 117 indicates that the aircraft is not in a holding pattern, or has not yet established a holding pattern.

In various aspects, a turn comprises a series of maneuvers that change the direction of the aircraft by between 70 and 270 degrees from a previous course. The turn may be to the right (starboard) or to the left (port) from the perspective of the aircraft, and by convention the direction is determined by a change in rate between adjacent samples in the flight data in which a change in heading of more than X degrees per second (e.g., 0.4 deg/s) is considered rightward and a change in heading of less than-X degrees per second is considered leftward. To identify the beginning of a turn from a straight leg and differentiate the two segments of the aircraft's trajectory, the holding detection module 117 may define a turn to be a sequence of flight samples in which the direction (e.g., left of right) of course change and the cumulative turn is more than an arc threshold of Y (e.g., 25) degrees. A leg would therefore include sequences of flight samples in which the cumulative turn rate is less than Y degrees before a course change in a different direction occurs.

At block 320, the holding detection module 117 identifies from the flight data for the aircraft whether the aircraft has traversed a leg that satisfies a definitional threshold for a leg.

In various aspects, when the aircraft travels along a course for longer than a distance threshold (e.g., 100 km) or continues to turn beyond an arc threshold (e.g., more than Y degrees), the holding detection modules 117 determines that the aircraft's trajectory does not satisfy the leg threshold, and method 300 proceeds to block 340, where the holding detection module 117 indicates that the aircraft is not in a holding pattern, or has not yet established a holding pattern. For example, the aircraft may have performed a turn (identified per block 315) that is part of a maneuver while on course to a destination, and the trajectory of the aircraft following the turn indicates that the aircraft is still en route, rather than one a leg in a holding pattern due to the aircraft holding course after the turn for too long or continuing to turn.

At block 325, the holding detection module 117 identifies from the flight data for the aircraft whether the aircraft has performed a second turn that is circuitous to the first turn. A circuitous turn is a turn that forms a circuit with the first turn, such as (from the perspective of the aircraft) a first left turn and a second left turn that define a counterclockwise circuit, or a first right turn and a second right turn that define a clockwise circuit. As will be appreciated, as the flight data sampled the location of the aircraft, and minor variations in the trajectory of the aircraft are possible, the circuit need not be a closed loop, but may instead define a "spiral" type pattern. When the aircraft is determined to have performed a second turn, method 300 proceeds to block 330. However, if the aircraft has not performed a second turn, method 300 proceeds to block 340, where the holding detection module 117 indicates that the aircraft is not in a holding pattern, or has not yet established a holding pattern.

At blocks 330 and 335, the holding detection module 117 filters potential racetrack maneuvers for the aircraft from being identified as a holding pattern. In some examples, racetrack maneuvers are procedures designed to enable an aircraft to reduce altitude during the initial approach segment and/or establish the aircraft inbound when the entry into a reversal procedure is not practical." While racetracks often have the same or similar shape as holding patterns, the racetrack have distinguishing features as described herein.

At block 330, the holding detection module 117 identifies from the flight data for the aircraft a vicinity distance between the aircraft and the destination airport and determines whether the vicinity distance is above a predefined vicinity threshold. For example, the aircraft vicinity distance is within a vicinity threshold (15 NM) of the destination airport the maneuvers identified in blocks 315-325 may be potential racetrack maneuver. When the aircraft is determined to be outside of the vicinity threshold, method 300 proceeds to block 350. However, if the aircraft is within the vicinity threshold, method 300 proceeds to block 335.

At block 335, the holding detection module 117 determines whether aircraft is in a racetrack pattern. In some examples, holding detection module 117, determines from the flight data for the aircraft, a difference between an altitude of the aircraft during the first turn at block 315 and an altitude of the aircraft during the second turn at block 325. In some examples, when the difference is above an altitude change threshold (e.g., 1000 ft.), the holding detection module 117 indicates that the aircraft is in a racetrack pattern and method 300 proceeds to block 340, where the holding detection module 117 indicates that the aircraft is not in a holding pattern, or has not yet established a holding pattern. When the difference is below the altitude change threshold, the holding detection module 117 indicates that the aircraft is not in a racetrack pattern and method 300 proceeds to block 350.

In some examples, when the vicinity distance is below the vicinity threshold, holding detection module 117 compares aircraft maneuvers and altitudes of the aircraft during the first turn (at block 315), during the second turn (at block 325), and during the leg traverse (at block 320) to maneuvers and altitudes in a predefined racetrack procedure. For example, the holding detection module 117 uses predefined racetracks in the navigation database 170 to compare the predefine maneuvers to the maneuvers performed by the aircraft.

In some examples, when the comparison indicates a match between the maneuvers and altitudes of the aircraft and maneuvers and altitudes in the predefined racetrack procedure, the holding detection module 117 indicates that the aircraft is in a racetrack pattern and method 300 proceeds to block 340, where the holding detection module 117 indicates that the aircraft is not in a holding pattern, or has not yet established a holding pattern. When the comparison indicates no match between the maneuvers and altitudes of the aircraft and maneuvers and altitudes in the predefined racetrack procedure, the holding detection module 117 indicates that the aircraft is not in a racetrack pattern and method 300 proceeds to block 350.

At block 350 the holding detection module 117 indicates that the aircraft is in a holding pattern. In some examples, the holding detection module 117 may continue to indicate the status of the aircraft as holding so long as the aircraft continues to travel in the holding pattern. Accordingly, method 300 may return to block 305 to monitor the status of the aircraft to ensure that the aircraft has not left the holding pattern (e.g., by beginning a descent phase or otherwise no longer following the circuit).

At block 340 the holding detection module indicates that the aircraft is not in a holding pattern, or has not yet established a holding pattern. Method 300 may return to block 305 to continue monitoring the aircraft to determine when the aircraft has established a holding pattern.

In various aspects, the holding detection module 117 indicates that the aircraft is not in the hold pattern as a default value for the status of the aircraft that may be overridden by any one of several rule sets for hold pattern determination or by a prioritized rule set for hold pattern determination. For example, if method 300 were to indicate that a given aircraft is not in a holding pattern, but a different method (e.g., method 500 discussed in relation to FIG. 5) were to indicate that the given aircraft is in a holding pattern, the holding detection module 117 may indicate that the given aircraft is in a holding pattern despite method 300 not (yet) indicating that the given aircraft is in a holding pattern.

Figure 4:
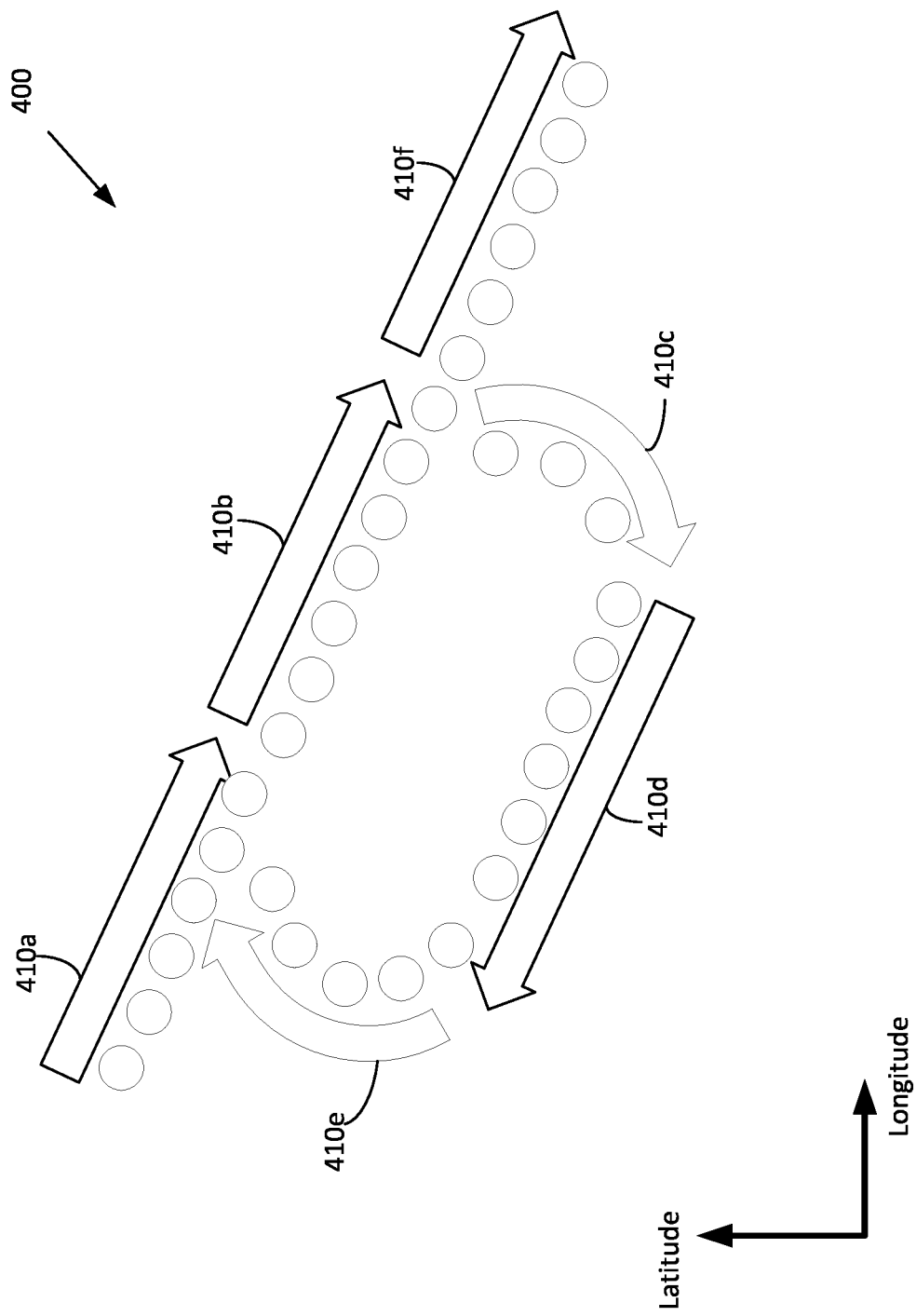
FIG. 4 is a flightpath diagram for an aircraft observed in an uncharted holding pattern, according to aspects of the present disclosure.

FIG. 4 is a flightpath diagram 400 for an aircraft observed in an uncharted holding pattern, such as may be determined according to method 300 described in relation to FIG. 3 and according to aspects of the present disclosure. The location of the aircraft is determined from reported flight data for the aircraft, indicated in the flightpath diagram 400 as circles at various latitudes and longitudes taken at various sampling times. The locations of the aircraft defines the flightpath of the aircraft, which is divided into several segments in FIG. 4 for explaining the determination of whether the aircraft is in a holding pattern.

An aircraft traveling along a trajectory with six segments 410*a-f* is shown. The aircraft travel along the first segment 410*a* and the second segment 410*b* before beginning a first turn in the third segment 410*c* (e.g., the first turn detected per block 315 in FIG. 4). The aircraft then traverses a leg in the opposite direction from the second segment 410*b* during the fourth segment 410*d* (e.g., the leg detected per block 320 in FIG. 4). The aircraft then begins a second turn in the fifth segment 410*e* (e.g., the second turn detected per block 325 in FIG. 4), at which time the holding detection module can determine that the aircraft is in a holding pattern when the aircraft including the segments 410*a-e* are along a predefined flight path distance (e.g., per block 305 in FIG. 3), at a predefined altitude (e.g., per block 310 in FIG. 3), and are not a racetrack pattern (e.g., per blocks 330 and 335 in FIG. 3).

In some examples, the aircraft may repeat one or more of the second through fifth segments 410*a-e* for multiple loops of the holding pattern before being signaled to resume travel to a destination (which may be the same or a different destination as when the holding pattern was entered into) and/or to land. As illustrated in FIG. 4, the sixth segment 410*f* indicates that aircraft continues in the same direction as the first segment 410*a* and the second segment 410*b* after leaving the holding pattern. In some examples, the aircraft may exit the holding pattern by proceeding in a different direction or descending below a threshold altitude (e.g., as part of landing procedures in a racetrack pattern, etc.).

Figure 5:
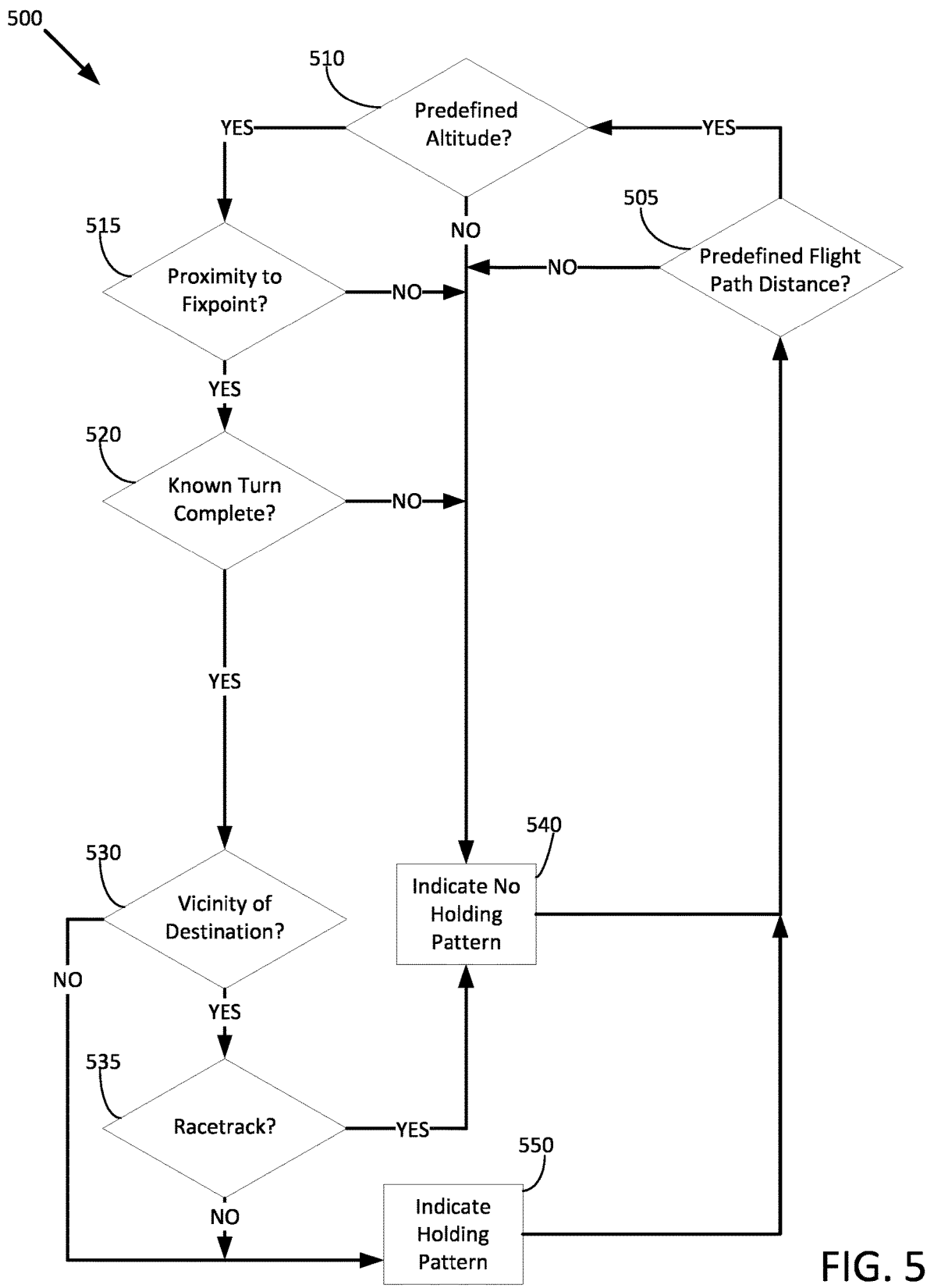
FIG. 5 is a flowchart of a method for detecting an aircraft in a charted holding pattern, according to aspects of the present disclosure.

FIG. 5 is a flowchart of a method 500 for detecting an aircraft in a charted holding pattern, according to aspects of the present disclosure. Method 500 represents one implementation of the holding detection rules applied by the holding detection module, which may apply several such rules in parallel at the same time to one aircraft and in parallel for several different aircraft.

Method 500 begins with block 505 where the holding detection module 117 determines whether the aircraft the aircraft has traveled at least a predefined distance along a flight path for the aircraft. In some examples, an aircraft may climb in altitude around an origin airport due to high obstacles or terrain in the vicinity. In this example, the aircraft is constantly in a small radius away from the origin airport. In one example, the aircraft may enter into a holding pattern during this ascent, where the aircraft remains within a small radius of the origin airport. In order to avoid such false-negative detection from a simple distance determination, the holding detection module 117 utilizes a predefined flown flight path distance instead (e.g. 14 nautical miles (NM)) along its flown path (in contrast to a distance from the origin airport). Additionally, using a predefined flown flight path distance filters out potential false-positive detections due to an aircraft ascending in several turns.

Accordingly, when the aircraft is less than the predefined distance along a flight path for the aircraft, method 500 proceeds to block 540, where the holding detection module 117 indicates that the aircraft is not in a holding pattern, or has not yet established a holding pattern.

At block 510, the holding detection module 117 determines whether the aircraft is above a predefined altitude. For example, when the aircraft is below the predefined altitude/height (e.g., 1000 ft.), the aircraft may be engaged in a takeoff or landing maneuver, and is therefore unlikely to be in a holding pattern. Accordingly, when the aircraft is below the threshold altitude, method 500 proceeds to block 540, where the holding detection module indicates that the aircraft is not in a holding pattern, or has not yet established a holding pattern.

At block 515, the holding detection module identifies from the flight data for the aircraft that the aircraft has passed within a predefined distance (e.g., 0.5 km) of a fixpoint or other navigational aid associated with a known holding pattern trajectory. In various aspects, points or regions in space that have historically been identified with aircraft flying in a holding pattern are identified by a machine learning model so that when an aircraft reaches that point or region the holding detection module is put on alert for other behaviors indicative to the aircraft entering a hold pattern. For example, an air traffic controller may instruct several aircraft at different times to head to point X,Y (as an example fixpoint) and perform holding pattern maneuvers. When the holding detection module 117 identifies that the aircraft has moved within a predefined proximity of a fixpoint, method 500 proceeds to block 520. Otherwise, method 500 proceeds to block 540, where the holding detection module 117 indicates that the aircraft is not in a holding pattern, or has not yet established a holding pattern.

At block 520, the holding detection module 117 identifies whether the aircraft completes a turn in a known direction associated with a historical holding pattern previous charted from the fixpoint identified in block 515. For example an air traffic controller may direct pilots to proceed to the fixpoint and then perform a turn for a specified amount of time or distance in a specified direction at a specified rate (e.g., head to point X,Y and turn westward for one minute). If the aircraft passes near the fixpoint, but either does not turn, or turns in a direction that does not correspond to historically observed holding patterns (e.g., turning eastward when aircraft have been observed turning westward when entering a holding pattern, performing too tight/not tight enough of a turn), method 500 proceeds to block 540, where the holding detection module 117 indicates that the aircraft is not in a holding pattern, or has not yet established a holding pattern. When the holding detection module identifies that the aircraft has passed the fixpoint and completed a known turn associated with a holding pattern, method 500 proceeds to block 530.

At blocks 530 and 535, the holding detection module 117 filters potential racetrack maneuvers for the aircraft from being identified as a holding pattern. At block 530, the holding detection module 117 identifies from the flight data for the aircraft a vicinity distance between the aircraft and the destination airport and determines whether the vicinity distance is above a predefined vicinity threshold. For example, the aircraft vicinity distance is within a vicinity threshold (15 NM) of the destination airport the maneuvers identified in blocks 515 and 520 may be a potential racetrack maneuver. When the aircraft is determined to be outside of the vicinity threshold, method 500 proceeds to block 550. However, if the aircraft is within the vicinity threshold, method 500 proceeds to block 535.

At block 535, the holding detection module 117 determines whether aircraft is in a racetrack pattern. In some examples, holding detection module 117, determines from the flight data for the aircraft, a difference between an altitude of the aircraft at a first time before performing the turn in the known direction at block 520 and an altitude of the aircraft at a second time after performing the turn in the known direction. In some examples, when the difference is above an altitude change threshold (e.g., 1000 ft.), the holding detection module 117 indicates that the aircraft is in a racetrack pattern and method 500 proceeds to block 540, where the holding detection module 117 indicates that the aircraft is not in a holding pattern, or has not yet established a holding pattern. When the difference is below the altitude change threshold, the holding detection module 117 indicates that the aircraft is not in a racetrack pattern and method 500 proceeds to block 550.

In some examples, when the vicinity distance is below the vicinity threshold, holding detection module 117 compares aircraft maneuvers and altitudes of the aircraft during known turn (at block 520), to maneuvers and altitudes in a predefined racetrack procedure. For example, the holding detection module 117 uses predefined racetracks in the navigation database 170 to compare the predefined maneuvers to the maneuvers performed by the aircraft.

In some examples, when the comparison indicates a match between the maneuvers and altitudes of the aircraft and maneuvers and altitudes in the predefined racetrack procedure, the holding detection module 117 indicates that the aircraft is in a racetrack pattern and method 500 proceeds to block 540, where the holding detection module 117 indicates that the aircraft is not in a holding pattern, or has not yet established a holding pattern. When the comparison indicates no match between the maneuvers and altitudes of the aircraft and maneuvers and altitudes in the predefined racetrack procedure, the holding detection module 117 indicates that the aircraft is not in a racetrack pattern and method 500 proceeds to block 550.

At block 550 the holding detection module 117 indicates that the aircraft is in a holding pattern. The holding detection module 117 may continue to indicate the status of the aircraft as holding so long as the aircraft continues to travel in the holding pattern. Accordingly, method 500 may return to block 505 to monitor the status of the aircraft to ensure that the aircraft has not left the holding pattern (e.g., by beginning a descent phase or otherwise no longer following the circuit).

At block 540, the holding detection module 117 indicates that the aircraft is not in a holding pattern, or has not yet established a holding pattern. Method 500 may return to block 505 to continue monitoring the aircraft to determine when the aircraft has established a holding pattern.

In various aspects, the holding detection module 117 indicates that the aircraft is not in the hold pattern as a default value for the status of the aircraft that may be overridden by any one of several rule sets for hold pattern determination or by a prioritized rule set for hold pattern determination. For example, if method 500 were to indicate that a given aircraft is not in a holding pattern, but a different method (e.g., method 300 discussed in relation to FIG. 3) were to indicate that the given aircraft is in a holding pattern, the holding detection module may indicate that the given aircraft is in a holding pattern despite method 500 not (yet) indicating that the given aircraft is in a holding pattern.

Figure 6:
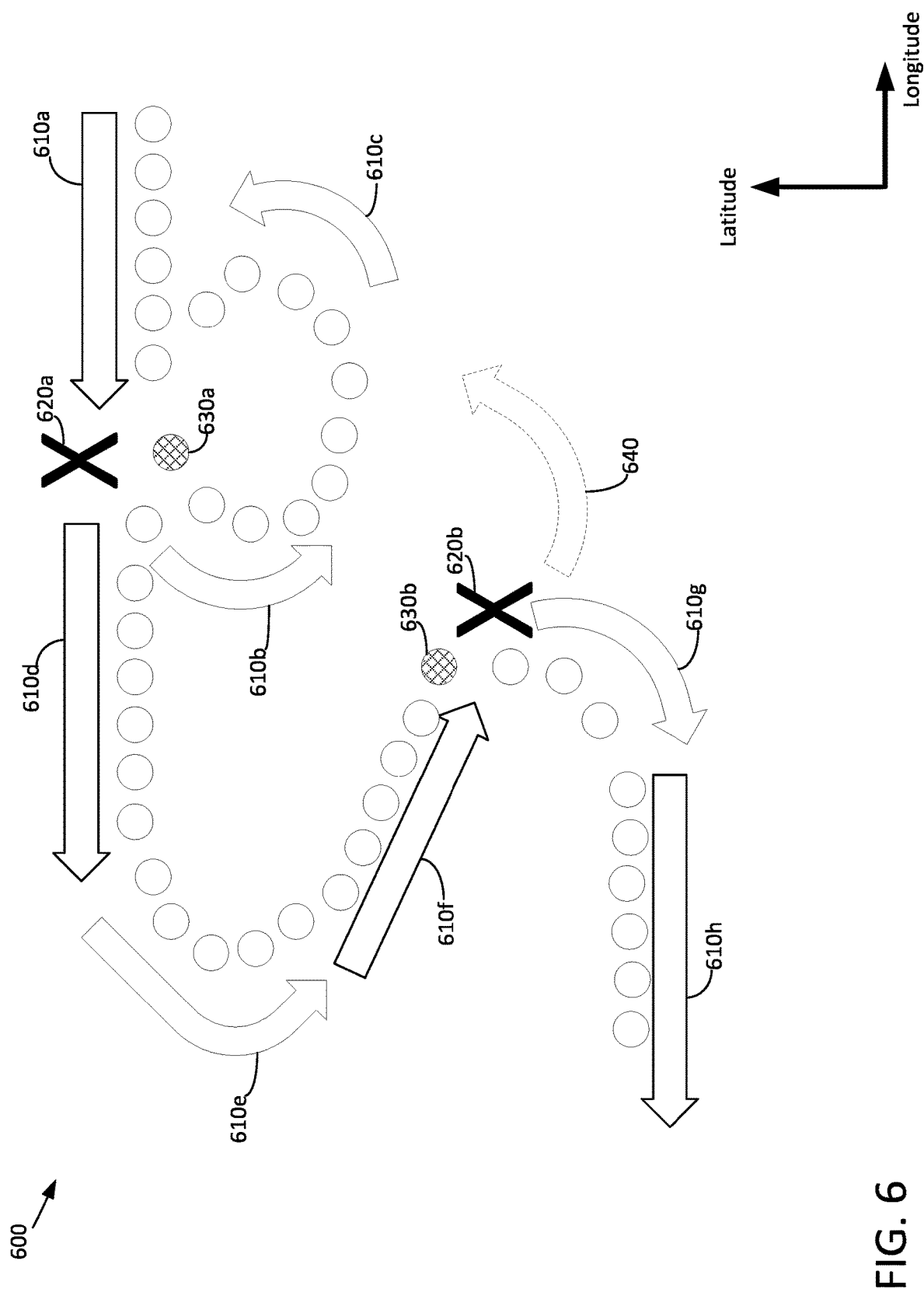
FIG. 6 is a flightpath diagram for an aircraft observed in a charted holding pattern, according to aspects of the present disclosure.

FIG. 6 is a flightpath diagram 600 for an aircraft observed in a charted holding pattern, such as may be determined as according to method 500 described in relation to FIG. 5 according to aspects of the present disclosure. The location of the aircraft is determined from reported flight data for the aircraft, indicated in the flightpath diagram 600 as circles at various latitudes and longitudes taken at various sampling times. The locations of the aircraft defines the flightpath of the aircraft, which is divided into several segments 610 in FIG. 11 for explaining the determination of whether the aircraft is in a holding pattern. Additionally, the location of a first fixpoint 620a, and a second fixpoint 620b are shown, and a first proximity point 630a in the reported flight data (near the first fixpoint 620a) and a second proximity point 630b in the reported flight data (near the second fixpoint 620b) are also shown.

An aircraft traveling along a trajectory with eight segments 610a-h is shown. The aircraft travel along the first segment 610a until the aircraft reaches the first proximity point 630a within a predefined distance of the first fixpoint 620a (e.g., as per block 515 in FIG. 5). The aircraft then begins a first turn in a known direction from the first fixpoint 620a along the second segment 610b (e.g., as per block 520 in FIG. 5). When the known turn is complete, the holding detection module can determine that the aircraft is in a holding pattern when the aircraft including the segments 610b-c are along a predefined flight path distance (e.g., per block 505 in FIG. 5), at a predefined altitude (e.g., per block 510 in FIG. 5), and are not a racetrack pattern (e.g., per blocks 530 and 535 in FIG. 5).

Depending on the flightpath specified for the holding pattern, the aircraft may travel on an outbound leg for a specified amount of time or distance (see, the fourth segment 410d in FIG. 4, compared to an inbound leg of the second segment 410b in FIG. 4) defining an oval flightpath for the holding pattern, or may begin a second turn after the first to define a circular flightpath for the holding pattern. The aircraft then begins a second turn in the third segment 610c. The aircraft can repeat one or more of the second through third segments 610b-c for multiple loops of the holding pattern before being signaled to resume travel to a destination (which may be the same or a different destination as when the holding pattern was entered into) and/or to land. The aircraft may be determined to have exited the holding pattern by being located more than a threshold distance from the fixpoint, a historically observed flightpath for the holding pattern, or descending below a threshold altitude (e.g., as part of landing procedures).

As illustrated in FIG. 6, the fourth segment 610d indicates that aircraft continues in the same direction as the first segment 610a after leaving the holding pattern, but other aspects, the aircraft may exit the holding pattern by proceeding in a different direction or descending below a threshold altitude (e.g., as part of landing procedures).

The aircraft may perform several other flight segments that include turns or straight legs (e.g., the fifth segment 610e and the sixth segment 610f respectively) and approach other fixpoints, such as the second fixpoint 620b. As illustrated in FIG. 6, when the aircraft is located at the second proximity point 630b near the second fixpoint 620b, the aircraft turns right (from the aircraft's perspective) along a seventh segment 610g, but a known turn 640 associated with the second proximity point 630b indicates that aircraft in holding patterns generally turn left. Therefore the holding detection module 117 would determine that the aircraft is not in a holding pattern (e.g., per block 540 FIG. 5) after completing the turn. The aircraft then proceeds on the eighth segment 610h away from the second fixpoint 620b, although the aircraft may later be determined to have entered a holding pattern from that includes the seventh segment 610g (e.g., as a first turn per method 500 of FIG. 5).

Figure 7:
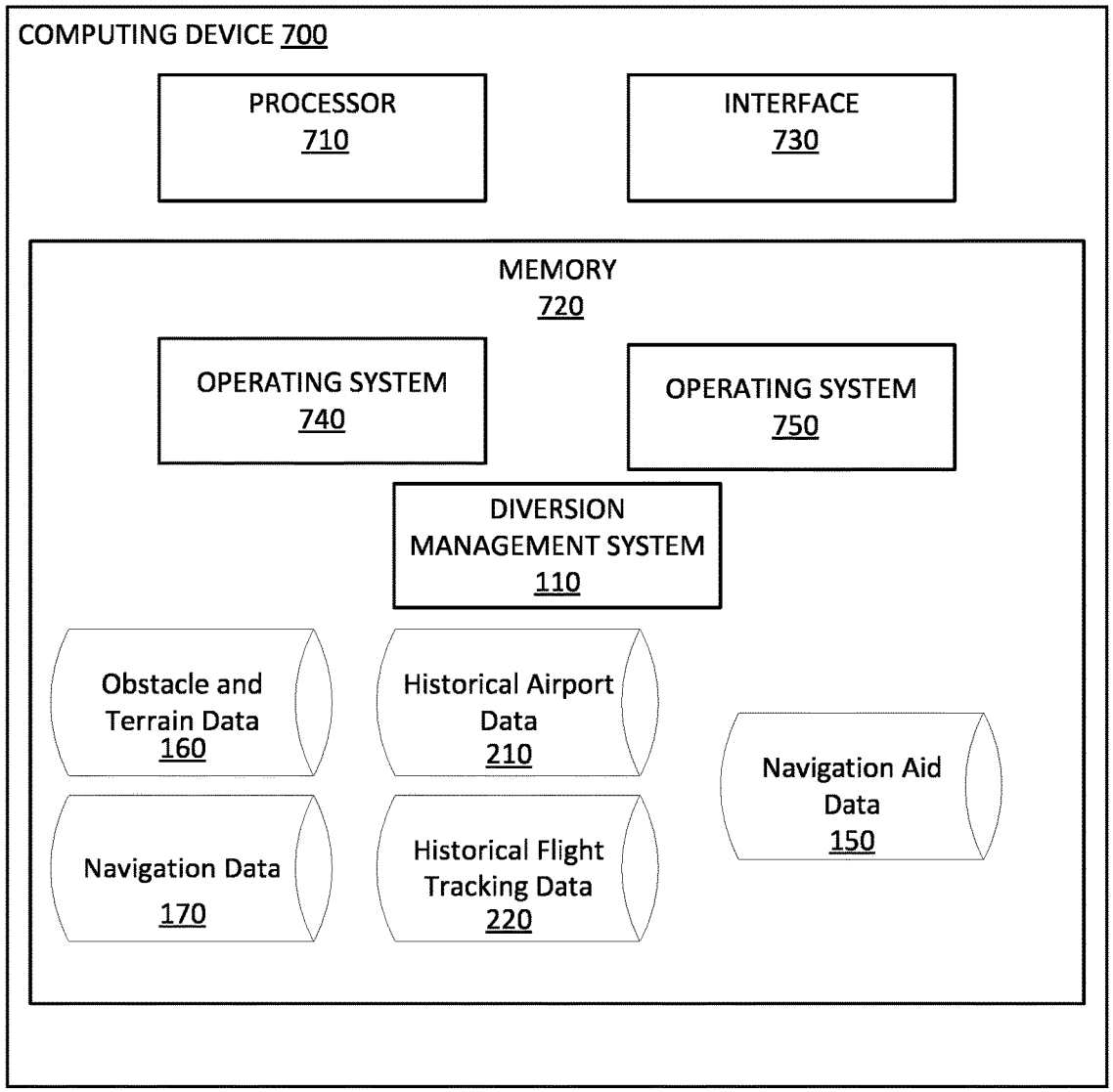
FIG. 7 illustrates example computing components of a computing system as may be used to provide predictive flight diversion management, according to aspects of the present disclosure.

FIG. 7 illustrates example computing components of a computing device 700 or other processing system as may be used to provide predictive holding pattern detection as described in the present disclosure.

The computing device 700 includes a processor 710, a memory 720, and an interface 730. The processor 710 and the memory 720 provide computing functionality to run the AI modules to process real-time data and output diversion alerts.

The processor 710, which may be any computer processor capable of performing the functions described herein, executes commands based on inputs received from a user and the data received from the interface 730.

The interface 730 connects the computing device 700 to external devices, such as, for example, external memory devices, external computing devices, a power source, a wireless transmitter, etc., and may include various connection ports (e.g., Universal Serial Bus (USB), Firewire, Ethernet, coaxial jacks) and cabling. The interface 730 is used to receive the live data and to output diversion recommendations.

The memory 720 is a memory storage device that generally includes various processor-executable instructions, that when executed by the processor 710, perform the various functions related to predictive flight diversion management discussed herein. The processor-executable instructions may generally be described or organized into various "applications" or "modules" in the memory 720, although alternate implementations may have different functions and/or combinations of functions. The memory 720 also generally includes data structures that store information for use by or output by the various applications or modules. In the present disclosure, the memory 720 includes at least instructions for an operating system 740 and one or more application(s) 750. The memory 720 may be one or more memory devices, such as, for example, Random Access Memory (RAM), Read Only Memory (ROM), flash memory, or any other type of volatile or non-volatile storage medium that includes instructions that the processor 710 may execute.

When the computing device 700 provides the functionality of the diversion management system 110, including the holding detection module 117, the memory 720 includes processor executable instructions to provide an application for the diversion management system 110 (and the various AI models and modules included therein) and provide the functionalities described in the present disclosure. In some aspects, the memory 720 includes databases for obstacle and terrain data 160, navigation data 170, the historical airport data 210, the historical flight tracking data 220, and navigation aid data 150 for use in training the AI models, but in other aspects the databases are maintained externally from the computing device 700 and are accessed via the interface 730.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF (Radio Frequency), etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   detecting, by a device and from flight data for an aircraft, that the aircraft has traveled at least a predefined distance along a flight path for the aircraft;
   identifying, by the device and from the flight data, that the aircraft has performed a first turn;
   identifying, by the device and from the flight data, that the aircraft has performed a leg traverse after performing the first turn;
   identifying, by the device and from the flight data, that the aircraft has performed a second turn in a direction circuitous to the first turn after performing the leg traverse;
   determining, by the device and from the flight data, a difference between an altitude of the aircraft during the first turn and an altitude of the aircraft during the second turn based on a vicinity distance being below a vicinity threshold;
   indicating, by the device and from flight data, that the aircraft is in a racetrack pattern based on the difference being above an altitude change threshold; and
   causing, by the device, the aircraft to align to a landing path at a destination airport based on the indication that the aircraft is in the racetrack pattern.

2. The method of claim 1, further comprising:
   indicating that the aircraft is in a holding pattern based on the difference being below the altitude change threshold.

3. The method of claim 1, further comprising:
   comparing, based on the vicinity distance being below the vicinity threshold, aircraft maneuvers and altitudes of the aircraft during the first turn, during the second turn, and during the leg traverse to maneuvers and altitudes in a predefined racetrack procedure;
   indicating that the aircraft is in the racetrack pattern based on the comparison indicating a match between the maneuvers and altitudes of the aircraft and maneuvers and altitudes in the predefined racetrack procedure; and
   indicating that the aircraft is in a holding pattern based on the comparison indicating no match between the maneuvers and altitudes of the aircraft and maneuvers and altitudes in the predefined racetrack procedure.

4. The method of claim 1, wherein the first turn and the second turn are identified as turns based on the flight data for the aircraft indicating that the aircraft performed a course change between 70 and 270 degrees from an inbound leg.

5. The method of claim 4, wherein a turn consists of a sequence of samples from the flight data in which a direction of the course change is constant.

6. The method of claim 4, wherein the leg traverse consists of a sequence of samples from the flight data in which a cumulative turn is less than a predefined arc threshold and a length of travel is less than a predefined distance threshold.

7. The method of claim 1, wherein the flight data indicates that the aircraft is at least above a predefined altitude or a predefined height when indicating that the aircraft is in a holding pattern.

8. The method of claim 1, further comprising:
   identifying an entry point of a holding pattern at which the first turn began; and
   continuing to indicate that the aircraft is in the holding pattern until the aircraft is a predefined distance away from the entry point or drops below a predefined altitude or a predefined height.

9. A method, comprising:
   detecting, by a device and from flight data for an aircraft, that the aircraft has traveled at least a predefined distance along a flight path for the aircraft;
   identifying, by the device and from the flight data, that the aircraft has passed within a predefined distance of a fixpoint;
   identifying, by the device and from the flight data, that the aircraft has performed a turn in a known direction associated with a historical holding pattern charted from the fixpoint;
   determining, by a device and from the flight data, a vicinity distance from a destination airport;
   indicating by the device, that the aircraft is in a holding pattern based on the vicinity distance being above a vicinity threshold;
   comparing, by the device, aircraft maneuvers and altitudes of the aircraft during the turn and altitude in a predefined racetrack procedure based on the vicinity distance being below a vicinity threshold;
   indicating, by the device, that the aircraft is in a racetrack pattern based on the comparison indicating a match between the turn and altitude of the aircraft and turn and altitude in the predefined racetrack procedure; and
   causing, by the device, the aircraft to align to a landing path based on the indication that the aircraft is in the racetrack pattern.

10. The method of claim 9, further comprising:
    determining, based on the vicinity distance being below a vicinity threshold and the flight data for the aircraft, a difference between an altitude of the aircraft at a first time before performing the turn in the known direction and an altitude of the aircraft at a second time after performing the turn in the known direction;
    indicating that the aircraft is in a racetrack pattern based on the difference being above an altitude change threshold, indicating that the aircraft is in a racetrack pattern; and
    indicating that the aircraft is in the holding pattern based on the difference being below the altitude change threshold.

11. The method of claim 9, further comprising:
    indicating that the aircraft is in the holding pattern based on the comparison indicating no match between the aircraft maneuvers and altitudes of the aircraft and maneuvers and altitudes in the predefined racetrack procedure.

12. The method of claim 9, further comprising:
identifying from flight data for the aircraft that the aircraft has passed within a second predefined distance of a second fixpoint; and
indicating that the aircraft is not in a second holding pattern in response to identifying from the flight data that the aircraft has performed a second turn that is not in a second known direction associated with a second historical holding pattern charted from the second fixpoint.

13. The method of claim 9, wherein the turn is identified based on the flight data for the aircraft indicating that the aircraft performed a course change between 70 and 270 degrees from an inbound leg.

14. The method of claim 9 wherein the turn consists of a sequence of samples from the flight data in which a direction of course change is constant.

15. The method of claim 9, wherein the flight data indicates that the aircraft is at least above a predefined altitude or a predefined height when indicating that the aircraft is in the holding pattern.

16. The method of claim 9, further comprising: continuing to indicate that the aircraft is in the holding pattern until the aircraft is a predefined distance away from the fixpoint or drops below a predefined altitude or a predefined height.

17. A system, comprising:
a processor; and
a memory storage device including instructions that when executed by the processor perform an operation comprising:
  detecting, from flight data for an aircraft, that the aircraft has traveled at least a predefined distance along a flight path for the aircraft;
  identifying, from the flight data, that the aircraft has performed a first turn;
  identifying, from the flight data, that the aircraft has performed a leg traverse after performing the first turn;
  identifying, from the flight data, that the aircraft has performed a second turn in a direction circuitous to the first turn after performing the leg traverse;
  determining, from the flight data, a vicinity distance from a destination airport;
  determining a difference between an altitude of the aircraft during the first turn and an altitude of the aircraft during the second turn based on the vicinity distance being below a vicinity threshold;
  indicating that the aircraft is in a racetrack pattern based on the difference being above an altitude change threshold; and
  causing the aircraft to align to a landing path based on the indication that the aircraft is in the racetrack pattern.

18. The system of claim 17, wherein the operation further comprises:
when the vicinity distance is below a vicinity threshold, determining from the flight data for the aircraft, a difference between an altitude of the aircraft during the first turn and an altitude of the aircraft during the second turn;
indicating that the aircraft is in the racetrack pattern based on the difference being above an altitude change threshold; and
indicating that the aircraft is in a holding pattern based on the difference being below the altitude change threshold.

19. The system of claim 17, wherein the operation further comprises:
comparing aircraft maneuvers and altitudes of the aircraft during the first turn, during the second turn, and during the leg traverse to maneuvers and altitudes in a predefined racetrack procedure based on the vicinity distance being below a vicinity threshold;
indicating that the aircraft is in the racetrack pattern based on the comparison indicating a match between the aircraft maneuvers and altitudes of the aircraft and aircraft maneuvers and altitudes in the predefined racetrack procedure; and
indicating that the aircraft is in a holding pattern based on the comparison indicating no match between the aircraft maneuvers and altitudes of the aircraft and aircraft maneuvers and altitudes in the predefined racetrack procedure.

20. The system of claim 17, wherein the flight data indicate that the aircraft is at least above a predefined altitude when indicating that the aircraft is in a holding pattern, and wherein the operation further comprises:
continuing to indicate that the aircraft is in the holding pattern until the aircraft is a predefined distance away from a fixpoint or drops below the predefined altitude or a predefined height.

* * * * *